(12) United States Patent
Faruque et al.

(10) Patent No.: US 10,562,488 B2
(45) Date of Patent: Feb. 18, 2020

(54) LOAD LIMITING SEATBELT RETRACTOR

(71) Applicant: Ford Global Technologies, LLC, Dearborn, MI (US)

(72) Inventors: Mohammed Omar Faruque, Ann Arbor, MI (US); James Chih Cheng, Troy, MI (US); Robert William McCoy, Ann Arbor, MI (US); Saeed David Barbat, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 247 days.

(21) Appl. No.: 15/585,599

(22) Filed: May 3, 2017

(65) Prior Publication Data
US 2018/0319362 A1  Nov. 8, 2018

(51) Int. Cl.
*B60R 22/36* (2006.01)
*B60R 22/34* (2006.01)
*F16F 9/06* (2006.01)
*F16F 9/10* (2006.01)
*F16F 9/30* (2006.01)

(52) U.S. Cl.
CPC ............ *B60R 22/341* (2013.01); *B60R 22/36* (2013.01); *F16F 9/06* (2013.01); *F16F 9/10* (2013.01); *F16F 9/30* (2013.01); *F16F 2222/08* (2013.01); *F16F 2224/046* (2013.01); *F16F 2224/048* (2013.01)

(58) Field of Classification Search
CPC . B60R 22/341; B60R 22/405; B60R 22/4633; B60R 22/4676; B60R 2022/282
See application file for complete search history.

(56) References Cited

U.S. PATENT DOCUMENTS

| 3,178,225 A | 4/1965 | Bayer |
| 3,881,667 A | 5/1975 | Tandetzke |
| 6,102,439 A | 8/2000 | Smithson et al. |

(Continued)

FOREIGN PATENT DOCUMENTS

| CN | 102275486 A | 12/2011 |
| CN | 104228622 A | 12/2014 |

(Continued)

OTHER PUBLICATIONS

Li et al., "Experimental Investigation On Liquid Infiltration Speed In Liquid Nanofoam", Proceedings of the ASME 2016 International Mechanical Engineering Congress and Exposition, IMECE 2016, Nov. 11-17, 2016, Phoenix, Arizona.

(Continued)

*Primary Examiner* — Sang K Kim
(74) *Attorney, Agent, or Firm* — Frank A. MacKenzie; Bejin Bieneman PLC

(57) ABSTRACT

A seatbelt retractor includes a base, a spool, a cylinder and a cylinder lock. The spool is rotatably coupled to the base and has a piston portion. The cylinder is engaged with the piston portion and therewith defines a first chamber. The piston portion is movable from a first position yielding a first chamber volume to a second position yielding a second chamber volume. The cylinder lock in a first condition rotatably fixes the cylinder to the base. Damping fluid is disposed in the chamber.

20 Claims, 9 Drawing Sheets

(56) References Cited

U.S. PATENT DOCUMENTS

| | | | |
|---|---|---|---|
| 6,237,959 | B1 | 5/2001 | Hishon |
| 6,481,659 | B1 | 11/2002 | Ashtiani et al. |
| 6,719,233 | B2 | 4/2004 | Specht et al. |
| 6,786,511 | B2 | 9/2004 | Heckmayr |
| 6,789,761 | B2 | 9/2004 | Glinka |
| 7,424,985 | B2 * | 9/2008 | Stevens ............... B60R 22/4633 242/370 |
| 7,424,986 | B2 * | 9/2008 | Stevens ............... B60R 22/4633 242/374 |
| 7,694,908 | B2 | 4/2010 | Lucht et al. |
| 7,828,331 | B2 | 11/2010 | Jessup et al. |
| 2002/0113424 | A1 | 8/2002 | Smith, Jr. et al. |
| 2015/0329076 | A1 | 11/2015 | Biller et al. |

FOREIGN PATENT DOCUMENTS

| | | | |
|---|---|---|---|
| DE | 29900232 | U1 | 6/1999 |
| DE | 102004051415 | A1 | 4/2006 |
| DE | 102005011826 | A1 | 9/2006 |
| DE | 102009014999 | A1 | 9/2010 |
| DE | 202010013814 | U1 | 3/2011 |
| DE | 102014221381 | A1 | 4/2016 |
| GB | 2389343 | A | 12/2003 |
| JP | H11334531 | A | 12/1999 |
| JP | 2017024491 | A | 2/2017 |
| JP | 2017043160 | A | 3/2017 |
| KR | 101294161 | B1 | 8/2013 |
| WO | 2016087022 | A1 | 6/2016 |
| WO | 2016150552 | A1 | 9/2016 |
| WO | 2017011304 | A1 | 1/2017 |

OTHER PUBLICATIONS

Lu et al., "Endcapping Treatment of Inner Surfaces of a Hexagonal Mesoporous Silica", J. Adhesion Sc. Technol. (2011), DOI:10.1163/156856111X599599, Copyright Koninklijke Brill NV, Leiden, 2011.
GB Search Report dated Oct. 19, 2018 re GB Appl. No. 1806841.1.
GB Search Report dated Oct. 26, 2018 re GB Appl. No. 1807189.4.
GB Search Report dated Oct. 26, 2018 re GB Appl. No. 1807173.8.
Non-Final Office Action dated Mar. 4, 2019 re U.S. Appl. No. 15/585,638, filed May 3, 2017.

* cited by examiner

LOAD LIMITING SEATBELT RETRACTOR

BACKGROUND

A seatbelt system may include a retractor for paying out seatbelt webbing. The retractor includes a spool around which the webbing is wrapped. The webbing unwinds from the spool when the webbing is buckled by the seat occupant. In the event of a vehicle impact, the spool is locked, preventing its rotation and preventing any further unwinding of the webbing. The sudden locking, in combination with an inertia of the occupant, may result in a resistive load of the webbing against the occupant sufficient to cause occupant discomfort. A load limiting mechanism within the retractor allows a cushioned termination of the webbing travel to reduce such discomfort. A known load limiting mechanism includes a torsion bar disposed in a center of the spool. The torsion bar may be a cylindrical bar of steel having a yield strength selected to allow the bar to torsionally yield at a value associated with a potential threshold of discomfort. Twisting of the torsion bar absorbs some of the inertia energy, thereby reducing the load sustained by the occupant against the webbing. The torsion bar, when plastically deformed, must be replaced. It is desired to provide a reusable load limiting mechanism.

DETAILED DESCRIPTION

Figure 1:
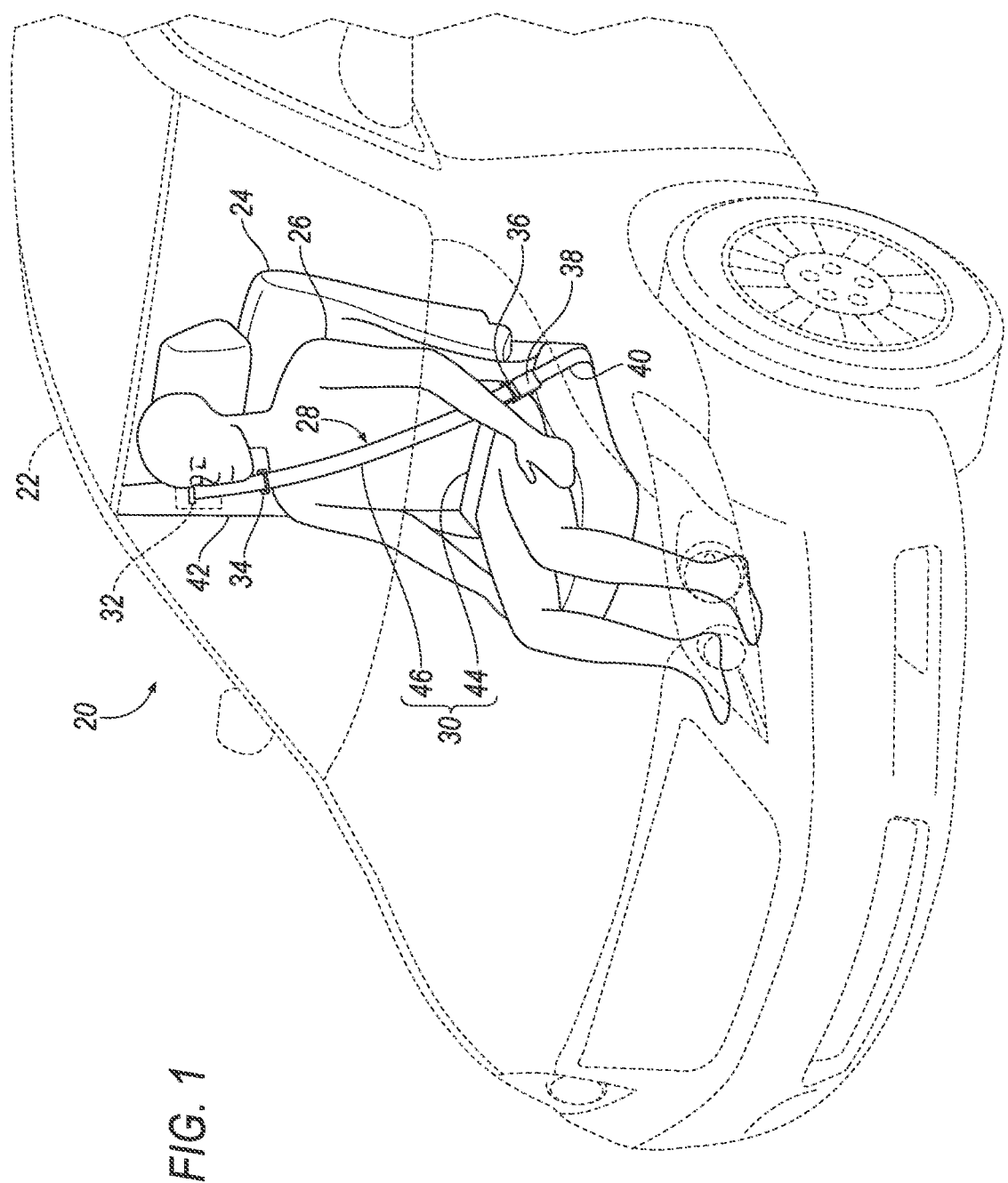
FIG. 1 is a perspective view of a vehicle occupant with an example seatbelt system.
Figure 2:
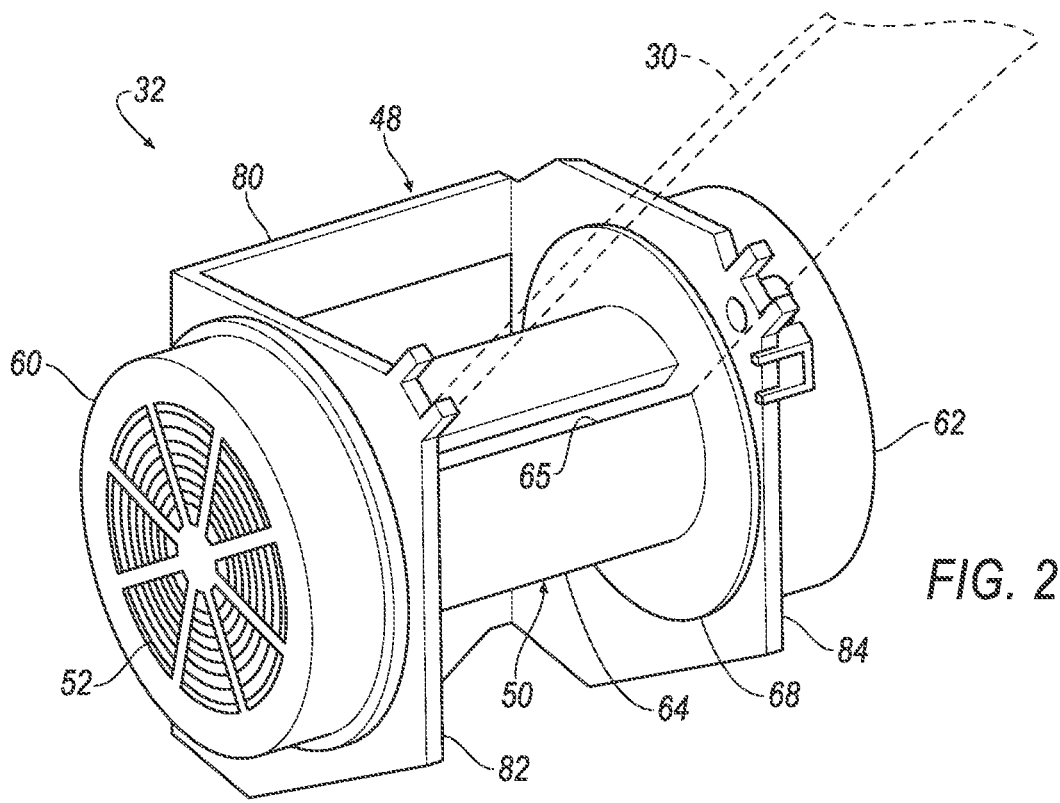
FIG. 2 is a first perspective view of an example retractor.
Figure 3:
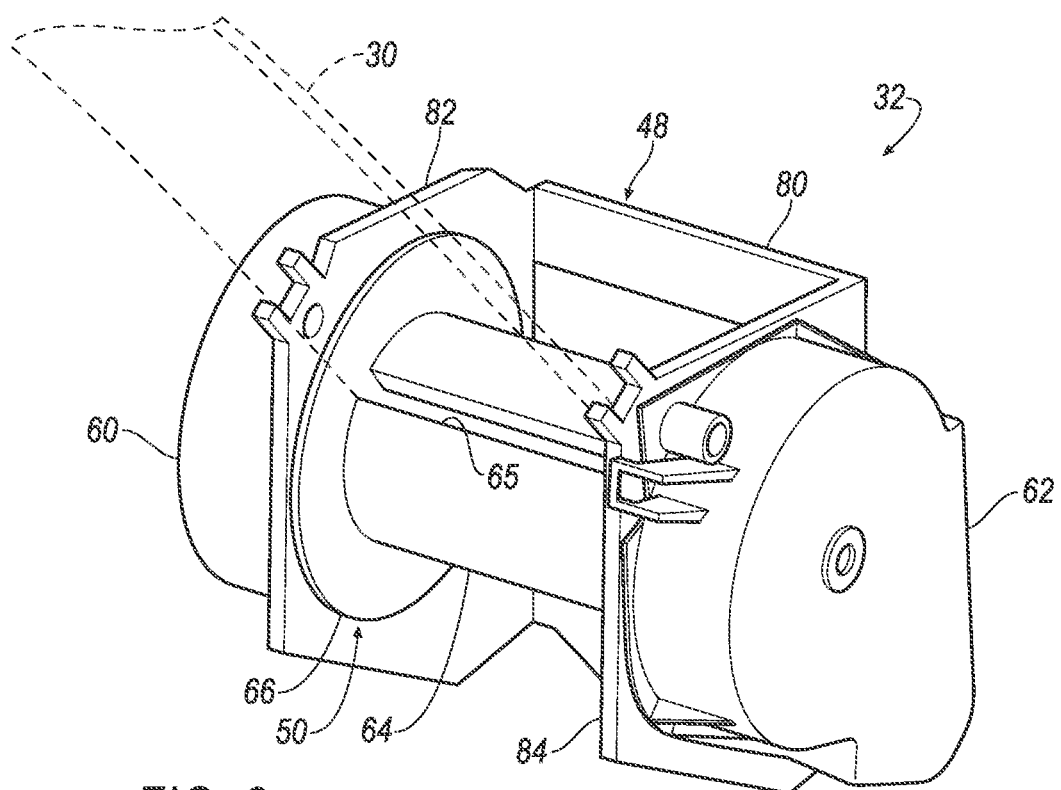
FIG. 3 is a second perspective view of the example retractor of FIG. 2.
Figure 4:
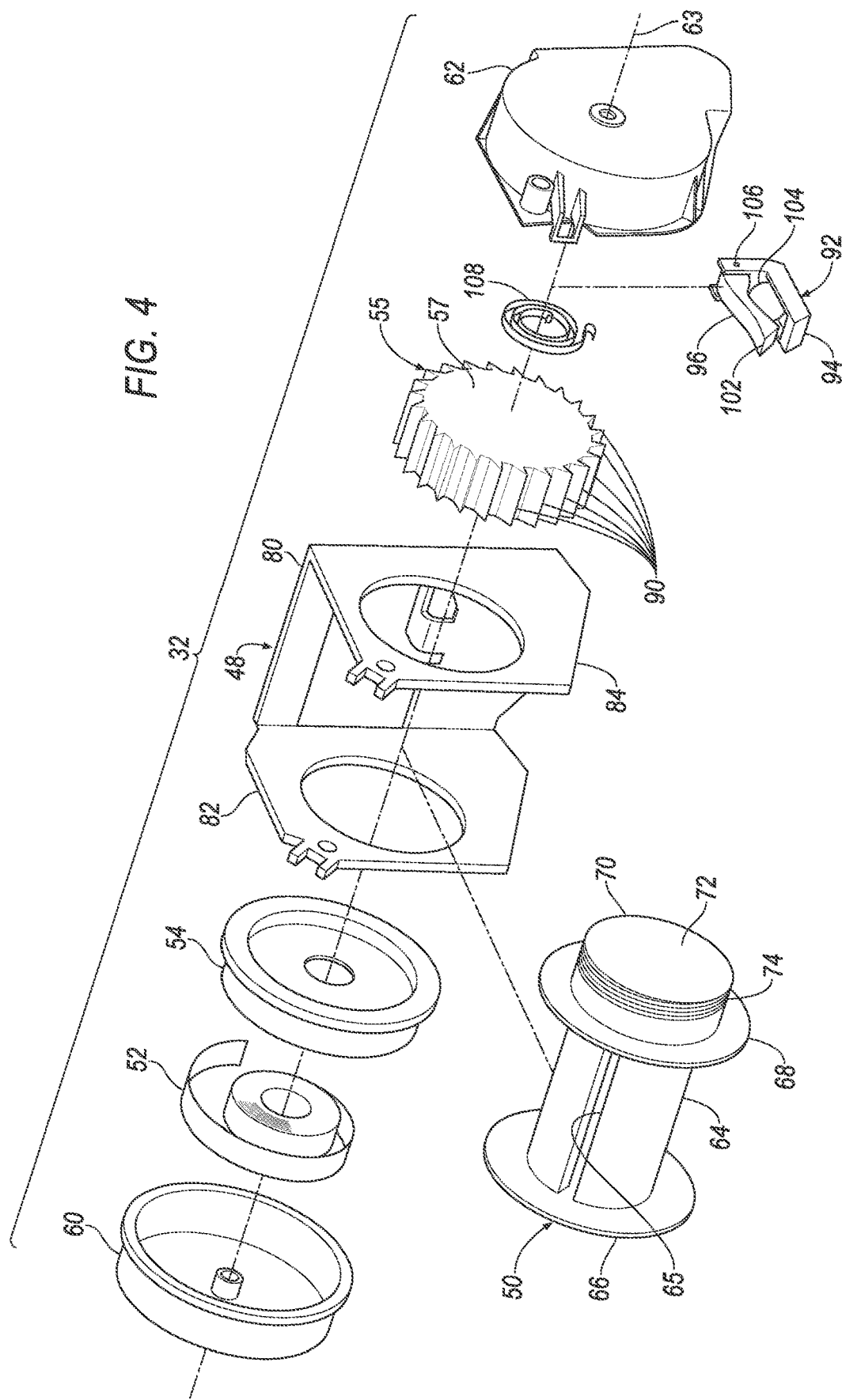
FIG. 4 is an exploded view of the example retractor of FIGS. 2 and 3.
Figure 5:
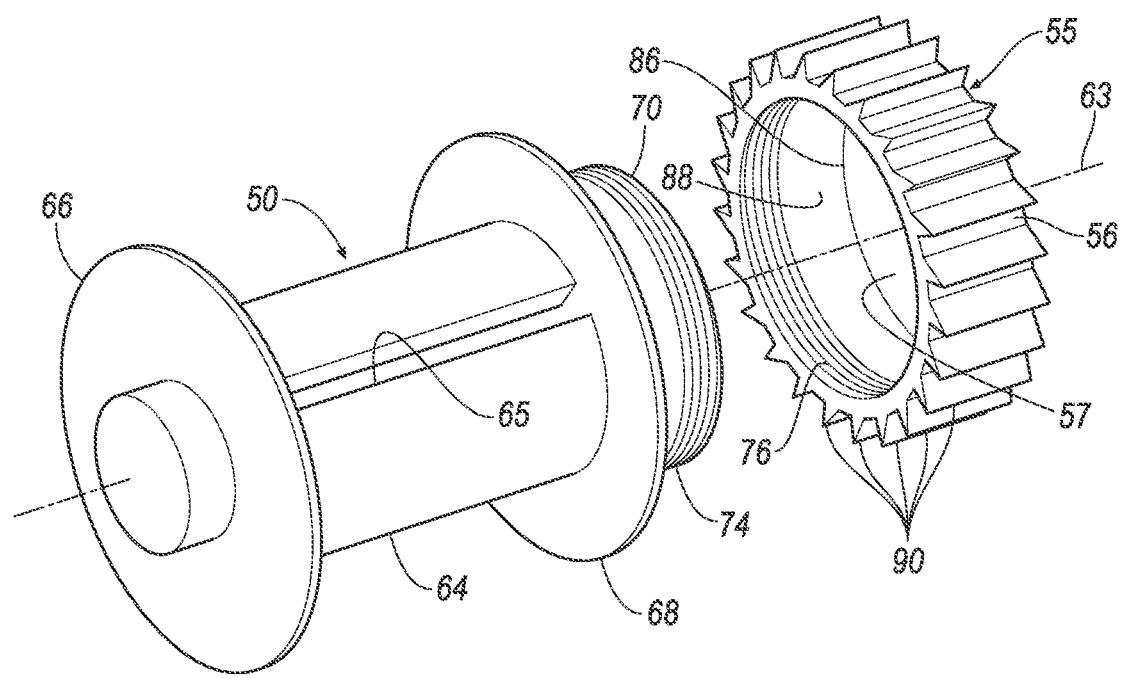
FIG. 5 is a perspective view of an example spool and an example chamber cylinder.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt retractor includes a base, a spool, a cylinder and a cylinder lock. The spool is rotatably coupled to the base and has a piston portion. The cylinder is engaged with the piston portion and therewith defines a first chamber. The piston portion is movable from a first position yielding a first chamber volume to a second position yielding a second chamber volume. The cylinder lock in a first condition rotatably fixes the cylinder to the base. Damping fluid is disposed in the chamber.

The spool of the retractor may define an axis of rotation, with the piston portion being centered on the axis of rotation, and the cylinder being centered on the axis of rotation.

The piston portion may have piston threads and the cylinder may have cylinder threads. The piston threads and the cylinder threads may be in threaded engagement with each other.

The cylinder may receive the piston portion, with the cylinder threads being formed on an inside diameter of the chamber and the piston threads being formed on an outside diameter of the piston portion.

The cylinder lock may include a plurality of clutching teeth and an engagement mechanism. The plurality of clutching teeth may be disposed on an outer circumference of the cylinder for rotation therewith. The engagement mechanism may be fixed in part to the base and include an engagement tooth, the engagement tooth in the first condition being in engagement with the clutching teeth and the engagement tooth in a second condition being not in engagement with the clutching teeth. Engagement of the engagement tooth with the clutching teeth rotatably fixes the cylinder to the base.

The damping fluid may be a heterogeneous mixture including hydrophobic nanoporous particles and a liquid.

The nanoporous particles may have nanopores. In the first position of the piston portion, the nanopores are substantially filled with a gas and in the second position of the piston portion the nanopores are substantially filled with the liquid.

The heterogeneous mixture may be a colloid of hydrophobic nanoporous particles in a liquid.

The particles may be formed of silica.

The particles may have a hydrophobic surface treatment.

A combination of a pitch of the threads and a constitution of the particles and a volume of the chamber may allow the spool to rotate twice before the fluid becomes substantially incompressible.

A volume of the heterogeneous mixture when the piston portion is in the second position may be at most half of a volume of the heterogeneous mixture when the piston portion is in the first position.

The mixture may be constituted to allow a return to the volume in the first position when the first chamber volume is restored.

A supplementary capsule may be sealingly fixed to the cylinder. The supplementary capsule may define a second chamber and an aperture disposed between and connecting the first chamber and the second chamber.

The second chamber may be substantially filled with a gas when the piston portion is in the first position. The second chamber may be substantially filled with the mixture when the piston portion is in the second position.

A valve may be disposed over the aperture.

The aperture may be sized to block a flow of the mixture therethrough at a first pressure associated with the first position of the piston portion.

An example restraint system 20, as illustrated in FIGS. 1-15, may be disposed in a vehicle 22. The vehicle 22 includes a seat 24 that may support an occupant 26 of the vehicle 22. The seat 24 may be a front seat or a rear seat, and may be in any cross-vehicle position. The seat 24 shown in FIG. 1 is a bucket seat, but alternatively the seat 24 may be a bench seat or another type of seat. The occupant 26 may be an adult or adolescent, or may alternatively be a child car seat for supporting an infant or young child. The position and orientation of the seat 24 and components thereof may be adjustable by the occupant 26.

The restraint system 20 includes an example seatbelt system 28 and may also include an airbag system (not shown). The illustrated seatbelt system 28 is a three-point system. By three-point, it is meant that a seatbelt, i.e., a webbing, 30 of the system 28 restrains the occupant 26 at three points: at a shoulder, in the example of FIG. 1 the right shoulder, and on both sides of the occupant's lap.

The seatbelt system 28 may include, in addition to the seatbelt 30, a retractor 32, a D-ring 34, a seatbelt latch plate 36, an anchor (not shown), a buckle 38, and a buckle mount 40. The seatbelt system 28 may, alternatively, include another arrangement of attachment points. The seatbelt system 28, when fastened, retains the occupant 26 on the seat 24, e.g., during sudden decelerations of the vehicle 22.

The retractor 32 receives and dispenses a first end of the seatbelt 30. The retractor 32 may be fixed, as illustrated, to the vehicle structure, e.g., to a B-pillar 42, or alternatively, to a frame of the seat 24. An alternative vehicle structure location includes a floor of the vehicle 22.

The D-ring 34 provides a consistent orientation of the seatbelt 30 across the occupant's shoulder, e.g., in a back of the seat 24. The D-ring, when included, receives the seatbelt 30 and directs the seatbelt 30 from the retractor 32 across the shoulder of the occupant 26. The D-ring may be fixed to the back of the seat, or, alternatively, to a structural component of the vehicle, e.g. a B-pillar 42. When the retractor 32 is mounted to one of the B-pillar 42 and the seat frame, the D-ring 34 may be omitted from the system 28.

The seatbelt latch plate 36, i.e., a clip, selectively engages the buckle 38 on an inboard side of the occupant 26. The latch plate 36 is received by a slot 45 in the buckle. The buckle 38 is fixed to the vehicle structure or to the seat frame by the buckle mount 40.

The seatbelt anchor may be in the form of an anchor plate (not shown) and may be disposed on an outboard side of the seat 24. The plate is fixed to a second end of the seatbelt 30 opposite the retractor 32 and is also fixed to one of the frame of the seat 14 and the structure of the vehicle 12 to thereby fix the second end of the seatbelt 30.

The latch plate 36 slides freely along the seatbelt 30 and, when engaged with the buckle 38, divides the seatbelt 30 into a lap band 44 and a shoulder band 46. The lap band 44 is disposed between the latch plate 36 and the anchor. The shoulder band 46 may be disposed between the latch plate 36 and the D-ring 34.

With reference to the FIGS. 2-10 the example retractor 32 includes a base 48, a spool 50, a retractor spring 52, a disc 54, a chamber cylinder 55, a cylinder lock 58, a spring cover 60, and a lock cover 62. The spool 50 is rotatably coupled to the base 48. The example disc 54 is fixed to a first end of the spool 50 for rotation therewith. The chamber cylinder 55 is threaded to a second end of the spool 50. The retractor spring 52 is disposed between the spool 50 and the base 48.

The spring cover 60 is fixed to the base 48 at the first end of the spool, and is disposed over the disc 54 and the spring 52. The spring 52 may connect on one end to the spring cover 60 and on a second end to the disc. The lock cover 62 is fixed to the base 48 at the second end of the spool 50 and is disposed over the chamber cylinder 55 and the lock 58. The illustrated lock 58, best shown in FIGS. 9 and 10, may include components fixed to either the base 48 or the lock cover 62.

The spool 50 is rotatably coupled to the base 48 for rotation about an axis of rotation 63 defined by the spool. The spool 50 may freely rotate relative to the base 48. The first end of the seatbelt 30 is connected to the spool 50. The spool 50 includes a hub 64 that may be cylindrical in shape and centered on the axis 63. The spool 50 may be adapted to receive the seatbelt 30, for example, by including a webbing attachment slot 65 and permitting the seatbelt 30 to wind around the hub 64 of the spool 50.

The seatbelt 30 may be attached to the spool 50. Specifically, one end of the seatbelt 30 may be attached to the seatbelt anchor, and another end of the seatbelt 30 may be attached to the spool 50, with the seatbelt 30 wound around the spool 50 beginning at that end. The seatbelt 30 may be formed of a fabric in the shape of a strap.

The spool 50 may include a first flange 66 at a first end of the hub 64 and a second flange 68 at a second end of the hub 64. The flanges 66, 68 may provide a border for the seatbelt 30, helping to maintain the layers or wraps of the seatbelt over the hub 64 in alignment with each other. A piston portion 70, coaxial with the hub 64, may extend from a side of the second flange 68, opposite the hub 64. The example piston portion 70 may be closed on an end, e.g., an end plate 72, opposite the hub 64. An extreme end of the piston portion 70, opposite the hub 64, has threads 74, i.e., piston threads for engagement with threads 76, i.e., cylinder threads, in an inside diameter of the chamber cylinder 55. The cylinder 55 may be coaxial with the piston portion 70 and the hub 64.

The retractor spring 52 rotatably biases the spool 50 relative to the base 48. The retractor spring, as noted above, may extend from the base 48 to the spool 50 either directly or indirectly, e.g., through the disc 54 and the cover 60. The retractor spring 52 may be loaded in tension or compression when the seatbelt 30 is fully retracted, and the retractor spring 52 may be further loaded in either tension or compression when the seatbelt 30 is extended from the spool 50. Thus, the retractor spring 52 may exert a force tending to retract the seatbelt 30. The retractor spring 52 may be a spiral torsion spring or any other suitable type of spring.

The base 48 may be formed of stamped sheet steel or other suitably rigid material, e.g., plastic. The base 48 may include a center portion 80 connecting a first wing 82 and a second wing 84. The first wing 82 and the second wing 84 are on opposite sides of the center portion 80 and face each other. The wings receive the spool 50, with the flanges 66, 68 being disposed between the wings 82, 84. The base 48 may be mounted to a structural element of the vehicle 22, e.g., to the B pillar 42 in the instance the seat 24 is a front seat, to a C pillar (not shown) when the seat 24 is a rear seat, or may be mounted to the seat 24.

The chamber cylinder 55 may have a cylindrical side wall 56 and an end wall 57. The end wall 57 may be planar or may be curved, e.g., hemispherical. The cylinder threads 76 receive the piston threads 74. Cylinder 55 has a blind bore 86 into which the cylinder threads 76 are formed. The bore 86, together with the piston portion 70, defines a fluid chamber 88. A volume of the chamber 88 varies with a depth of the piston portion 70 into the blind bore 86.

The cylinder lock 58 may be any mechanism suited to preventing or restricting rotation of the cylinder 55 or the spool 50 relative to the base 48. Such mechanisms as lock 58 are known and are commercially available from companies including Autoliv Inc. and ZF Friedrichshafen AG. One type of cylinder lock may engage the cylinder with the base 48 responsive to a rapid movement of the webbing 30 and an associated rapid spinning of the spool 50. Another type of cylinder lock, consistent with the illustrated cylinder lock 58, may engage the cylinder 55 with the base 48 responsive to a sudden deceleration or rearward acceleration of the vehicle 22. It is also known to incorporate both types of mechanisms into a single retractor 32. The example cylinder lock 58 is just one approach to engaging the cylinder 55 with the base 48. The example cylinder lock 58 includes axially extending clutching teeth 90 disposed around an outer circumference of the cylinder 55 and an example engagement mechanism 92 that engages the clutching teeth 90 under predetermined conditions.

The engagement mechanism 92 may include a pivot arm 96 pivotable relative to a ball retainer 94. The ball retainer 94 includes a first ball track 98, and is fixed relative to the base 48. The pivot arm 96 includes a second ball track 100 facing the first ball track 98. The pivot arm 96 also includes an engagement tooth 102 on a side opposite the second ball track 100. In an installed position, the tracks are parallel with a forward direction of motion of the vehicle. A ball 104, e.g., a steel ball, is disposed in the tracks 98, 100. A hinge 106, allowing pivotable movement of the pivot arm 96 relative to the ball retainer 94, is at a rear of the tracks 98, 100.

Figure 9:
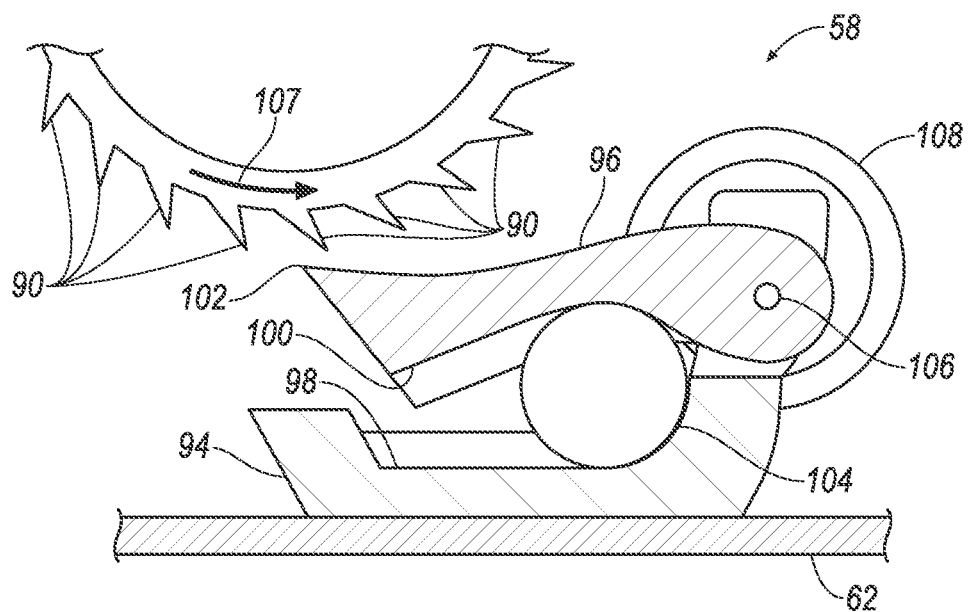
FIG. 9 is a sectional side view of an engagement mechanism in a non-impact condition.

In a first position, the tooth 102 and the pivot arm 96 are pivoted downwardly, ensuring that there is no engagement between the tooth 102 and the clutching teeth. Also in the first position, associated with the ball 104 being in a rearward position on the tracks 98, 100, as illustrated in FIG. 9, a distance between forward ends of the tracks 98,100 is less than a diameter of the ball 104. An unwinding direction of rotation of the spool 50 is indicated by an arrow 107. Rotation of spool 50 in the direction of arrow 107 results in the webbing 30 unwrapping from the spool 50, and being dispensed from the retractor 32.

Figure 10:
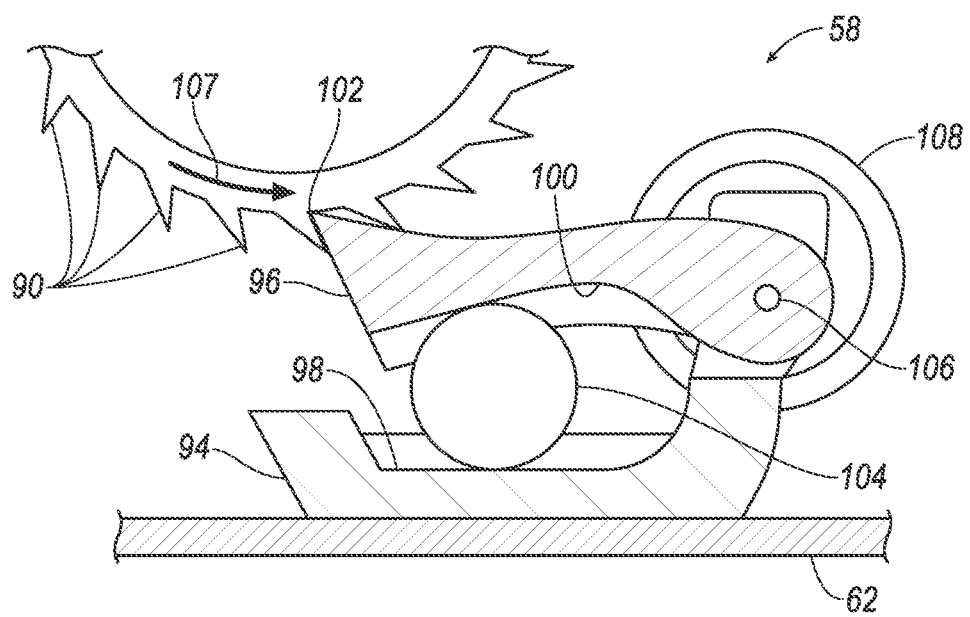
FIG. 10 is a sectional side view of the engagement mechanism of FIG. 9 in an impact condition.

In a second position, the tooth 102 and pivot arm 96 are pivoted upwardly, toward the cylinder 55 and the tooth 102 into engagement with the clutching teeth. In the second position, associated with the ball 104 being in a forward position on the tracks 98, 100, as illustrated in FIG. 10, a distance between forward ends of the tracks 98,100 is greater than the distance of the first position.

A pivot spring 108 may be disposed between the pivot arm 96 and the ball retainer 94 to bias the pivot arm 96 toward the disengaged position. The biasing of the pivot arm 96 downward may also bias the ball 104 to the disengaged position.

The second ball track 100 has a first portion in a first position relatively proximate to the hinge 106. With the cylinder lock 58 in a locked condition, i.e., with the engagement tooth 102 of pivot arm 96 engaging the clutching teeth 90, the cylinder 55 is fixed relative to the base 48.

A damping fluid 110 is disposed in the fluid chamber 88. The damping fluid 110 may be a nano-particle mixture that is compressible, e.g., a heterogeneous mixture 110 including nanoporous particles 112. The chamber 88 is sealed. As a resistive torque is applied to the cylinder 55 relative to the spool 50, and the piston portion 70 threads deeper into the cylinder 55, a pressure of the fluid 110 within the chamber 88 increases.

Figure 6:
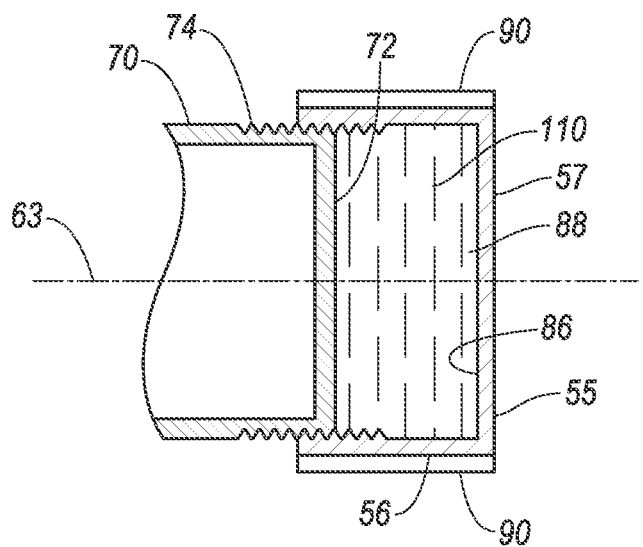
FIG. 6 is a sectional side view of a piston end of the spool of FIG. 5 in threaded engagement with the chamber cylinder in a neutral configuration.
Figure 7:
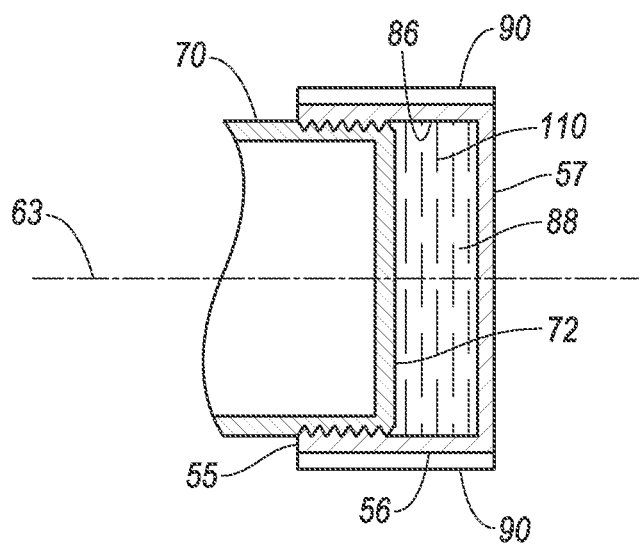
FIG. 7 is a sectional side view of the spool and chamber cylinder of FIG. 6 in a compressed configuration.

With reference to FIGS. 6 and 7, the heterogeneous mixture 110 is enclosed within the chamber 88. The cylinder 55 and the piston portion 70 cooperatively contain the heterogeneous mixture 110 and prevent the heterogeneous mixture 110 from freely flowing out of the chamber 88. The heterogeneous mixture 110 may fill the sealed volume of chamber 88.

Figure 11A:
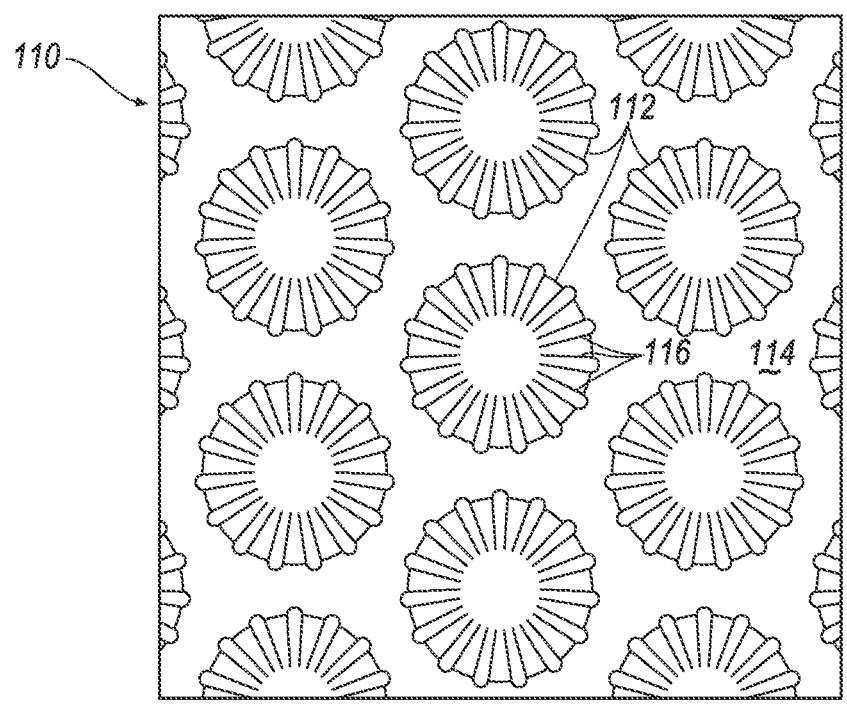
FIGS. 11A and 11B are schematic representations of a mixture including nanoporous particles.
Figure 11B:
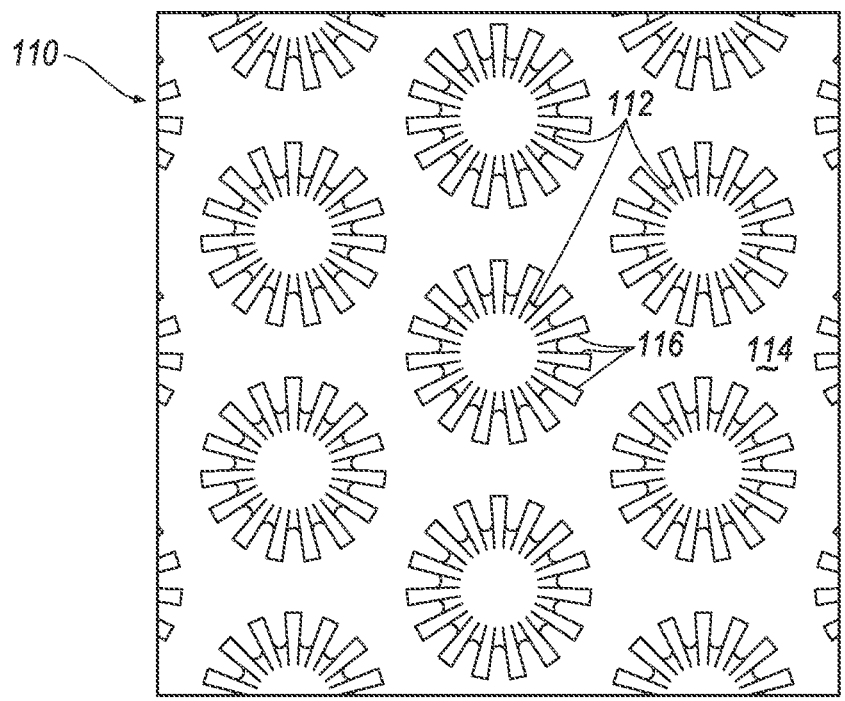
Figure 12:
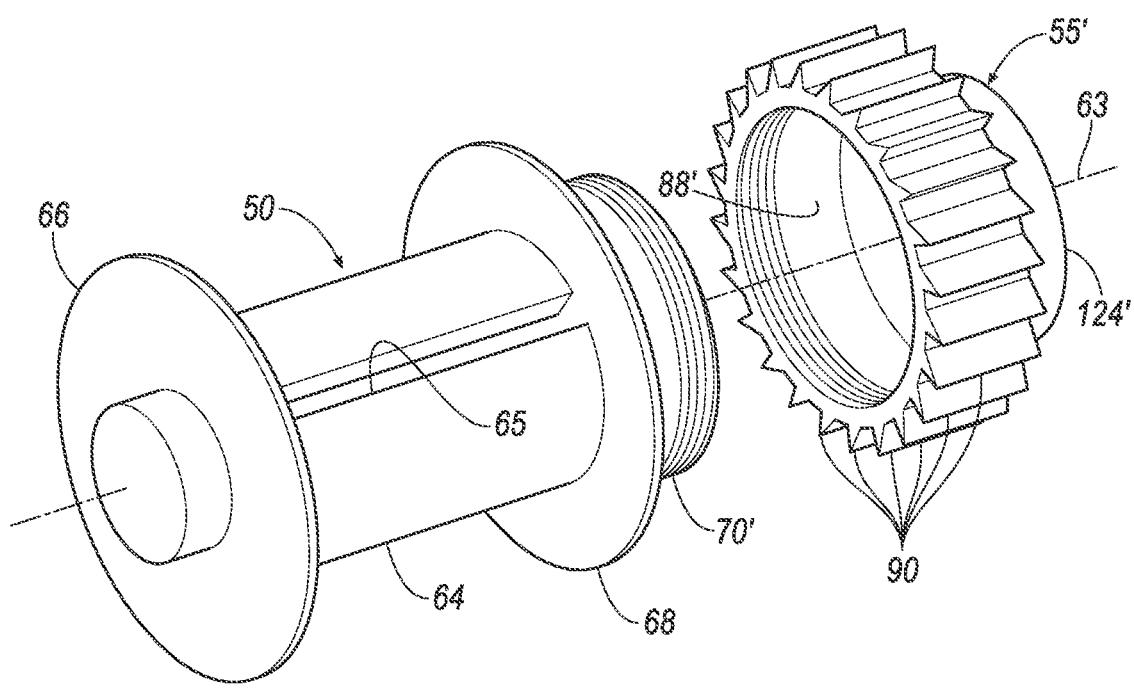
FIG. 12 is a perspective view of an example spool and an alternative example chamber cylinder.
Figure 13:
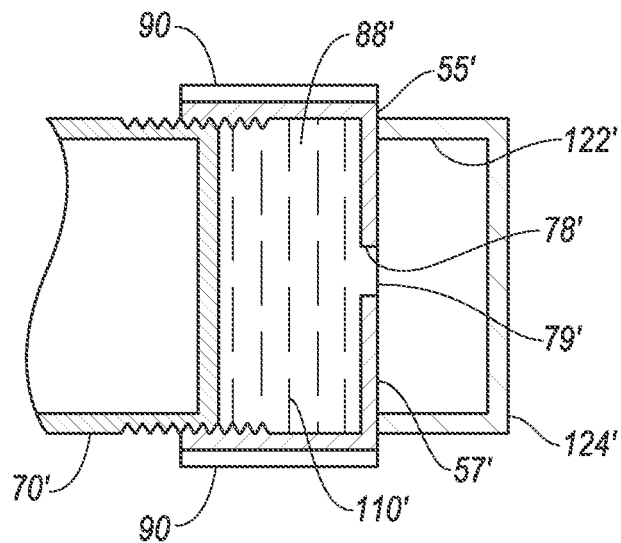
FIG. 13 is a sectional side view of a piston end of the spool of FIG. 11 in threaded engagement with the chamber cylinder in a neutral configuration.
Figure 14:
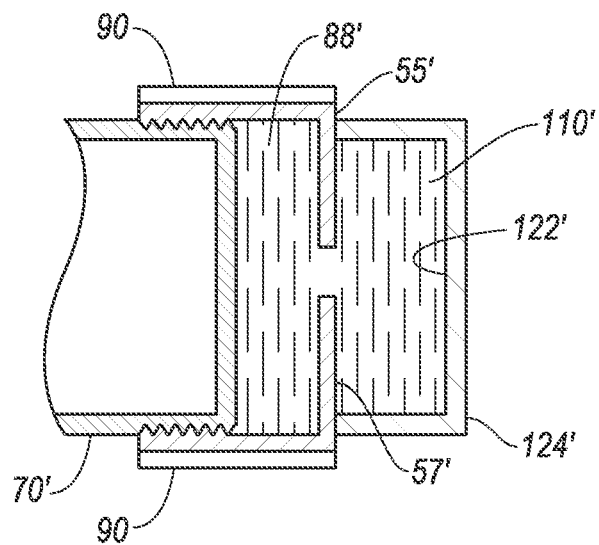
FIG. 14 is a sectional side view of the spool and chamber cylinder of FIG. 12 in a compressed configuration.
Figure 15:
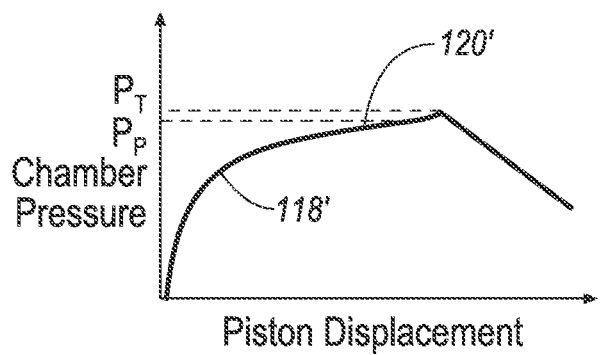
FIG. 15 is a plot of force versus displacement of the piston end relative to the chamber of FIGS. 12-14.

With reference to FIGS. 11A-B, the heterogeneous mixture 110 includes hydrophobic nanoporous particles 112 and a liquid 114. A "heterogeneous mixture" is made of different substances that remain separate, e.g., a colloid or a suspension, and, for the purpose of this discussion, includes liquid nanofoam. For example, the heterogeneous mixture 110 may be a colloid of the hydrophobic nanoporous particles 112 in the liquid 114. The liquid 114 may be any inert, i.e., nonreactive, liquid, e.g., water, lithium chloride, etc.

The particles 112 are nanoporous; in other words, the particles 112 have nanopores 116. The nanopores 116 may have diameters on the order of 1 nm to 100 nm. The particles 112 may be formed of, e.g., silica. The particles 112 are hydrophobic, that is, tending to repel water or fail to mix with water. The particles 112 may be formed of a material that is hydrophobic, or the particles 112 may have a hydrophobic surface treatment, e.g., chlorotrimethylsilane or chlorodimethyloctylsilane in toluene.

Figure 8:
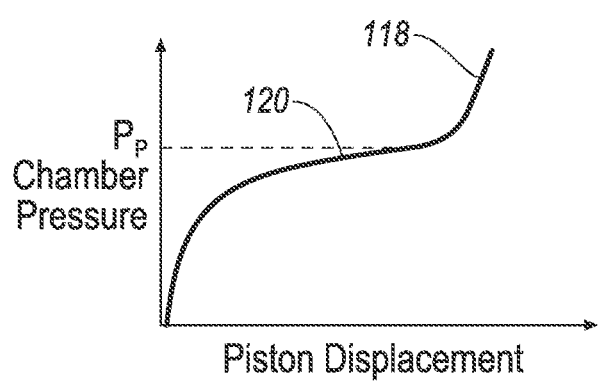
FIG. 8 is a plot of force versus displacement of the piston end relative to the chamber of FIGS. 5-7.

FIG. 8 is a graph of a curve 118 describing the relationship between a volume reduction of the heterogeneous mixture 110 and the pressure experienced by the heterogeneous mixture 110. As a volume occupied by the heterogeneous mixture 110 decreases, the pressure initially increases relatively steeply. As the volume continues to decrease, the pressure nears a plateau pressure $P_P$ and does not increase or increases only relatively slowly, as shown over a plateau region 120 of the curve 118. Over the plateau region 120, the slope of the curve 118, that is, the rate of change of pressure per unit of volume reduction, is less than the slope of other regions of the curve 118. The plateau pressure $P_P$ may be at an inflection point of the curve 118 in the plateau region 120, that is, the point at which a change in the direction of curvature of the curve 118 occurs, that is, a point separating a region of the curve 118 with decreasing slope from a region of the curve 118 with sharply increasing slope. After the plateau region 120, the fluid becomes practically incompressible with little additional volume reduction causing the pressure to rise sharply from the plateau region 120.

With reference to FIG. 11A, a gas, e.g., air, may fill the nanopores 116 of the particles 112 before a pressure-induced volume reduction occurs. Surface tension may aid in preventing the liquid 114 from entering the nanopores 116 at an initial pressure, e.g., atmospheric pressure. In the plateau region 120, the pressure becomes sufficient to overcome the surface tension, and the liquid 114 enters the nanopores 116, compressing the gas inside the nanopores 116 and substantially filling the nanopores 116, as shown in FIG. 11B. Once the nanopores 116 are mostly full of the liquid 114, and the volume of the mixture 110 has been reduced, the rate of pressure increase with volume decrease increases substantially as illustrated by the steeper slope. Depending at least in part on the available volume within the nanopores 116, the volume of the mixture 110 may be reduced by as much as 80% at an end of the plateau region 120. The plateau pressure $P_P$ and the length of the plateau region 120, as well as the potential for volume reduction, are affected by the choice of material for the particles 112, the average size of the particles 112, the number of nanopores 116 per particle 112, the average size of the nanopores 116, the surface treatment, and the choice of liquid 114.

The piston portion 70 is movable relative to the cylinder 55, and the cylinder 55 to the piston portion 70, from the first position of FIG. 6 and FIG. 11A in which the nanopores 116 are substantially filled with gas to the second position of FIG. 7 and FIG. 11B in which the nanopores 116 are substantially filled with the liquid 114. The volume of the heterogeneous mixture 110 when the piston portion 70 is in the second position may be at most half of the volume, i.e., half or less than half of the volume, e.g., as little as 20% of the volume, of the heterogeneous mixture 110 when the piston portion 70 is in the first position. As the piston portion 70 moves from the first position to the second position, the pressure in the heterogeneous mixture 110 follows the curve 118 in FIG. 8; because the chamber 88 has a constant cross-sectional area, the distance traveled by the piston portion 70 is linearly related to the volume reduction.

The chamber 88 may lack outlets; in other words, no routes are provided for the heterogeneous mixture 110 to escape the chamber 88. The compression of the heterogeneous mixture 110 may be partially or fully reversible. As the pressure decreases, the gas compressed in the nanopores 116 expands, and the volume occupied by the heterogeneous mixture 110 expands. The compression and expansion cycle may exhibit some hysteresis. All of the energy used to compress the mixture 110 may not be recovered during the expansion, with some of the difference being converted to heat energy.

Alternatively, with reference to FIGS. 12-15, a cylinder 55' may have an aperture 78' between a chamber 88' and a space outside the cylinder 55'. Specifically, the aperture 78' may be in the end wall 57'. A secondary chamber 122', defined in part by a supplementary capsule 124' sealingly fixed to cylinder 55' may extend around the aperture 78'. With the piston portion 70' in a first, unpressurized, i.e., atmospheric pressure, position of FIG. 13, the fluid, e.g., the mixture 110', is disposed only in the chamber 88'. The components, e.g., the piston portion 70', the cylinder 55', the supplementary capsule 124', may be configured to accommodate either the heterogeneous mixture, or an alternative, less compressible fluid, such as hydraulic fluid. A valve 79', e.g., a rupturable membrane across aperture 78', is optional. The secondary chamber 122' may initially be filled by a gas, e.g., air, in the first position of the piston portion 70'. As the chamber 88' starts to decrease in size, the secondary chamber 122' may receive and retain the heterogeneous mixture 110' that exits the chamber 88' through the aperture 78'.

The aperture 78' or valve 79' may have a pressure threshold $P_T$. When the liquid 114 is below the pressure threshold $P_T$, the aperture 78' blocks the liquid 114 from passing through the aperture 78'. When the liquid 114 is above the pressure threshold $P_T$, the aperture 78' allows the liquid 114 in the chamber 88' to pass through the aperture 78'. The pressure threshold $P_T$ may be passed shortly after volume is reduced out of a plateau region 120' of a volume reduction curve 118'. The pressure threshold $P_T$ may be greater than the plateau pressure $P_P$. The pressure threshold $P_T$ may be greater than a pressure required to compress the heterogeneous mixture 110' to half its original volume.

In the event of a frontal impact, the occupant 26 of the front seat 24 has forward momentum relative to the rest of the vehicle 22. Likewise, the ball 104 of the engagement mechanism 92 has forward momentum relative to the ball retainer 94 and the pivot arm 96. An associated forward motion of the ball 104 along tracks 98, 100 pivotably displaces pivot arm 96 against the torque of pivot spring 108 and away from retainer 94. The pivoting of pivot arm 96 brings engagement tooth 102 into engagement with the clutching teeth 90 of the cylinder 55, preventing further of the cylinder relative to the base 48.

The forward inertial motion of the occupant 26, and particularly of the upper torso of the occupant, may act against the webbing 30. With rotation of the cylinder 55 prevented by engagement of the tooth 102 with teeth 90, an inertial force of the occupant against the webbing 30, and particularly the shoulder band 46, is resisted by the spool 50 of the retractor 32.

Consistent with the embodiment of FIGS. 5-8, preventing rotation of the cylinder 55 does not immediately prevent rotation of the spool 50 and further dispensing of the webbing 30 from the retractor 32. Rotation of the spool 50 when cylinder 55 is locked threads piston portion 70 deeper into the cylinder 55, compressing the fluid 110 in the chamber 88. The volume of the fluid 110 decreases as the magnitude of the pressure against the fluid 110 increases, permitting a limited amount of continued spool rotation. The additional webbing dispensed by the retractor 32 from the spool 50 may be that corresponding to substantially two revolutions of the spool 50 after engagement of the tooth 102 with the teeth 90, e.g., approximately 8-10 inches.

The magnitude of available rotation, and thus an amount of webbing payed out, may be controlled by factors including of a pitch of the threads and an available amount of piston portion 70 to cylinder 55 travel. Piston portion 70 to cylinder 55 travel may in turn be affected by additional factors including: a depth of the chamber 88, and the characteristics of the fluid 110, including as mentioned above: the choice of material for the particles 112, the average size of the particles 112, the number of nanopores 116 per particle 112, the average size of the nanopores 116, the surface treatment, and the choice of liquid 114.

A substantial termination of spool rotation occurs when the when the fluid reaches maximum compression level and the pressure inside the chamber 88 sharply increases beyond the plateau pressure $P_P$, and the fluid 110 becomes sufficiently resistant to further compression that further rotation of the spool is substantially prevented. Some of the occupant's forward inertia energy is absorbed by the compression of the fluid 110, thus reducing the force imparted by the webbing 30 against the occupant 26 when the webbing stops during an incident such as a frontal impact.

After the impact, the retractor 32, and the position of the cylinder 55 on the piston portion 70 may be reset for reuse. If there is little compression hysteresis, the system may be able to self-reset.

Upon unbuckling the occupant after the impact, the retractor spring will rotate the spool in a winding direction, opposite the unwinding direction of arrow 107 best shown in FIGS. 9 and 10. Rotation in the winding direction draws the webbing 30 into the retractor 32, wrapping the webbing 30 around the spool 50. Moving the spool in the winding direction, opposite the unwinding direction of arrow 107, releases the tooth 102 from the teeth 90. The teeth 90 may act against the tooth 102 to aid the pivot spring 108 in restoring the pivot arm 96 to the disengaged position. Angles of engagement of the tracks 98, 100 with the ball 104 are selected to avoid a self-locking condition between the ball 104 and the pivot arm 96 and between the ball 104 and the retainer 94.

Once the force against the webbing 30 has been relieved, and thus, the torque of the spool 50 against the cylinder 55 tending to thread the piston portion 70 deeper into the cylinder 55 has been relieved, the pressure within the chamber 88 may tend to unwind the cylinder 55 from the spool 50 to expand the chamber 88. However, the occurrence of such unwinding will depend on factors including an angle of the threads 74, 76 and a coefficient of friction between the threads 76 of the cylinder 55 and the threads 74 of the piston portion 70. For systems that do not have thread characteristics suited to a spontaneous unwinding of the cylinder 55 from the spool 50, the cylinder 55 may be manually turned relative to the spool 50 to reset the size of the chamber 88 to its starting value.

The operation of the embodiment of FIGS. 12-15 is much the same as that of the embodiment of FIGS. 5-8. Differences include a potentially greater amount of energy absorption and greater belt travel for a given amount of fluid 110'. The arrangement of FIGS. 12-15 may also allow the use of a liquid damping fluid without nanoporous particles to absorb energy before bringing the spool rotation to a halt by, for example, having the piston portion 70' bottom out against the wall 57' of the cylinder 55' after two rotations. Another difference is that a tear-down of the retractor 32' may be needed to remove the fluid 110' from the secondary chamber 122'.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
   a base;
   a spool rotatably coupled to the base and including a piston portion;
   a cylinder engaged with the piston portion and therewith defining a first chamber, the piston portion movable from a first position yielding a first chamber volume to a second position yielding a second chamber volume;
   a cylinder lock in a first condition rotatably fixing the cylinder to the base; and
   a damping fluid in the chamber;
   wherein the damping fluid is a heterogeneous mixture including hydrophobic nanoporous particles and a liquid; and
   wherein the piston portion has piston threads and the cylinder has cylinder threads and the piston threads and the cylinder threads are in threaded engagement with each other and further wherein a combination of a pitch of the threads and a constitution of the particles and a volume of the chamber allow the spool to rotate twice before the fluid becomes substantially incompressible.

2. The seatbelt retractor of claim 1, wherein the spool defines an axis of rotation, the piston portion is centered on the axis of rotation, and the cylinder is centered on the axis of rotation.

3. The seatbelt retractor of claim 2, wherein the piston portion has piston threads and the cylinder has cylinder threads and the piston threads and the cylinder threads are in threaded engagement with each other.

4. The seatbelt retractor of claim 3, wherein the cylinder receives the piston portion with the cylinder threads being formed on an inside diameter of the chamber and the piston threads are formed on an outside diameter of the piston portion.

5. The seatbelt retractor of claim 1, wherein the cylinder lock includes:
   a plurality of clutching teeth disposed on an outer circumference of the cylinder for rotation therewith; and
   an engagement mechanism fixed in part to the base and including an engagement tooth, the engagement tooth in the first condition being in engagement with the clutching teeth and the engagement tooth in a second condition being not in engagement with the clutching teeth,
   wherein engagement of the engagement tooth with the clutching teeth rotatably fixes the cylinder to the base.

6. The seatbelt retractor of claim 1, wherein the particles have nanopores, and in the first position of the piston portion the nanopores are substantially filled with a gas and in the second position of the piston portion the nanopores are substantially filled with the liquid.

7. The seatbelt retractor of claim 1, wherein the heterogeneous mixture is a colloid of hydrophobic nanoporous particles in the liquid.

8. The seatbelt retractor of claim 1, wherein the particles are formed of silica.

9. The seatbelt retractor of claim 8, wherein the particles have a hydrophobic surface treatment.

10. The seatbelt retractor of claim 1, wherein a volume of the heterogeneous mixture when the piston portion is in the second position is at most half of the volume of the heterogeneous mixture when the piston portion is in the first position.

11. The seatbelt retractor of claim 10, wherein the mixture is constituted to allow a return to the volume in the first position when the first chamber volume is restored.

12. The seatbelt retractor of claim 1, further comprising a supplementary capsule sealingly fixed to the cylinder defining a second chamber and an aperture disposed between and connecting the first chamber and the second chamber.

13. The seatbelt retractor of claim 12, wherein the second chamber is substantially filled with a gas when the piston portion is in the first position and the second chamber is substantially filled with the fluid when the piston portion is in the second position.

14. The seatbelt retractor of claim 12, further comprising a valve disposed over the aperture.

15. The seatbelt retractor of claim 12, wherein the damping fluid is a heterogeneous mixture including hydrophobic nanoporous particles and a liquid.

16. The seatbelt retractor of claim 15, wherein the aperture is sized to block a flow of the mixture therethrough at a first pressure associated with the first position of the piston portion.

17. The seatbelt retractor of claim 16, wherein the heterogeneous mixture is a colloid of hydrophobic nanoporous particles in a liquid.

18. The seatbelt retractor of claim 16, wherein the particles are formed of silica and the particles have a hydrophobic surface treatment.

19. A seatbelt retractor comprising:
   a base;
   a spool rotatably coupled to the base and including a piston portion;
   a cylinder engaged with the piston portion and therewith defining a first chamber, the piston portion movable from a first position yielding a first chamber volume to a second position yielding a second chamber volume;

a cylinder lock in a first condition rotatably fixing the cylinder to the base; and a damping fluid in the chamber;

wherein the spool defines an axis of rotation, the piston portion is centered on the axis of rotation, and the cylinder is centered on the axis of rotation; and wherein the piston portion has piston threads and the cylinder has cylinder threads and the piston threads and the cylinder threads are in threaded engagement with each other.

20. A seatbelt retractor comprising:

a base;

a spool rotatably coupled to the base and including a piston portion;

a cylinder engaged with the piston portion and therewith defining a first chamber, the piston portion movable from a first position yielding a first chamber volume to a second position yielding a second chamber volume;

a cylinder lock in a first condition rotatably fixing the cylinder to the base;

a damping fluid in the chamber; and a supplementary capsule sealingly fixed to the cylinder defining a second chamber and an aperture disposed between and connecting the first chamber and the second chamber.

* * * * *